United States Patent [19]
van Overveld et al.
[11] 4,288,715
[45] Sep. 8, 1981

[54] LOW-PRESSURE MERCURY VAPOR DISCHARGE LAMP

[75] Inventors: Johan B. J. van Overveld, Roosendaal; Auke G. van der Kooi; Antonius J. A. van Stratum, both of Eindhoven, all of Netherlands

[73] Assignee: U.S. Philips Corporation, New York, N.Y.

[21] Appl. No.: 79,019

[22] Filed: Sep. 26, 1979

[30] Foreign Application Priority Data

Oct. 11, 1978 [NL] Netherlands ........................ 7810213

[51] Int. Cl.[3] ............................................ H01S 61/28
[52] U.S. Cl. .................................... 313/174; 313/490; 417/48
[58] Field of Search .................... 313/490, 174; 417/48

[56] References Cited

U.S. PATENT DOCUMENTS 4,157,485 6/1979 Wesselink et al. ............. 313/490 X

*Primary Examiner*—Palmer C. Demeo
*Assistant Examiner*—Darwin R. Hostetter
*Attorney, Agent, or Firm*—Robert S. Smith

[57] ABSTRACT

Low-pressure mercury vapor discharge lamp having in the discharge vessel a vapor pressure-controlling mercury amalgam which is secured to the inner surface of a wall of a container which is provided with an opening to the discharge vessel. Such securing reduces the risk that small portions of the amalgam might become dislodged by vibration or shock and escape from the container into the discharge vessel. The amalgam is secured to the container wall by fusion thereto by means of an intermediate "wetting" agent formed by a thin layer of nickel.

6 Claims, 4 Drawing Figures

LOW-PRESSURE MERCURY VAPOR DISCHARGE LAMP

Figure 1:
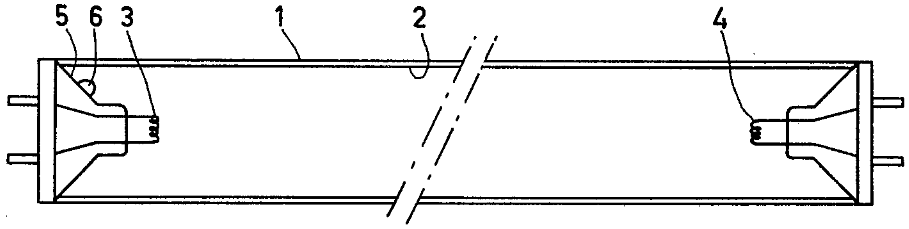

The invention relates to a low-pressure mercury vapor discharge lamp having a discharge vessel in which is located a substantially closed container having an opening into the discharge vessel. The container contains a mercury amalgam for controlling the mercury vapor pressure in the discharge vessel. Such a lamp is disclosed, for example, in United Kingdom Pat. No. 1,097,090.

With low-pressure mercury vapour discharge lamps, the efficiency of the conversion of the applied electric power into ultraviolet radiation is at its maximum at a mercury vapour pressure which does not much deviate in the operating condition from 0.8 to 1.3 pascal Pa. This is a vapor pressure which is in equilibrium with liquid mercury having a temperature of approximately 40° C. When the temperature in the discharge vessel increases much above this temperature, for example because the ambient temperature increases, the conversion efficiency decreases.

A known means to maintain the mercury vapor pressure as closely as possible to a value of 0.8 to 1.3 pascal Pa in spite of an increase in the temperature is the use of a mercury amalgam. Generally, such an amalgam for controlling the mercury vapor pressure is provided in a place in the discharge vessel which has an operating temperature which is the most favorable temperature for the action of the amalgam, for example on the so-called foot of the stem or on the wall of the discharge vessel.

A known method of providing an amalgam on the inner surface of the wall of a discharge vessel is by spraying, while being heated, the end of a wire of an amalgam-forming alloy (see, for example, United Kingdom Pat. No. 1,503,636) onto the wall.

In order to prevent the amalgam or the amalgam-forming alloy from becoming displaced and being moved to a random place in the discharge vessel during production or during operation of the lamp, United Kingdom Pat. No. 1,097,090 describes the enclosure of the amalgam in a perforated metal container or cage which is located in a place suitable for controlling the mercury vapor pressure. The amalgam or the amalgam-forming alloy may move freely in the container. This entails the risk that, during manufacture or during transportation of the lamp, small bits of the amalgam or the amalgam-forming alloy break off, owing to vibrations or shocks caused by collisions with the wall of the container, and escape into the discharge vessel, via the perforations. These loose bits may not only damage the luminescent layer or attack the electrodes, but may also affect the lamp properties in an adverse manner because they can adhere in a place in the discharge vessel where the temperature deviates from the temperature which is optimal for the operation of the amalgam.

It is an object of the invention to provide a low-pressure mercury vapor discharge lamp which at least mitigates the drawbacks of the prior art lamp.

This object is accomplished in a low-pressure mercury vapor discharge lamp of the type defined in the opening paragraph which, according to the invention, is characterized in that the amalgam is secured to the inner surface of the wall of the container.

This ensures that the amalgam remains in its place and that it cannot collide with the wall of the container as a result of shocks and vibrations, so that the risk that broken off loose bits of amalgam penetrate into the discharge vessel is very small. Should the amalgam nevertheless get detached from the surface of the inner wall owing to vibration or shock, the amalgam remains in the container which is located in the suitable place in the discharge vessel.

The container may have various shapes. Preferably, the container comprises a sheet metal plate formed to provide a receptacle which contains the amalgam and a metal cover plate also which closes the receptacle except for a slit of not more than 0.2 mm wide between the cover plate and the receptacle.

The cover plate serves to maintain the amalgam in the receptacle in the unlikely event that the amalgam breaks away from the wall of the receptacle owing to vibration.

A very strong adherence of the amalgam to the inner wall surface of the container is obtained if the inner wall surface of the container is provided with an approximately 3 micron thick nickel layer. This layer acts as a wetting agent and produces a very strong adherence of the amalgam to the wall on fusion of the amalgam thereto at a relatively high temperature (approx. 600° C.) in a reducing atmosphere. The surface of the cover plate facing towards the amalgam is provided with an amalgam repulsing layer (for example an iron oxide layer) in case the amalgam breaks away from the inner wall. This prevents the opening of the container from getting blocked by amalgam if the amalgam is displaced due to a shock.

In an embodiment of a low-pressure mercury vapor discharge lamp according to the invention, the container is located at a distance of 10 to 20 mm from the electrode and is attached to one end of a supporting wire, the other end of which is secured in the foot of the stem which carries the electrode and is electrically insulated from the electrode supply leads. The amalgam then rises to an operating temperature determined by the distance from an electrode, that in the discharge vessel the optimum mercury vapor pressure of 0.8 to 1.3 pascal is rapidly adjusted. Such a construction is advantageously used in small discharge lamps the discharge path of which is extended by folding or bending of a tubular discharge vessel. Such a folded discharge tube is generally enveloped by an outer bulb in order to increase the ease of handling of these lamps, which are used as an alternative to incandescent lamps. Especially with this type of lamp the temperature in the discharge vessel is relatively high during operation due to the reduced possibility to dissipate heat from the discharge tube.

With lamps according to the invention it is possible to provide the amalgam as one whole in the container, that is to say as an alloy of which the mercury forms part. However, during manufacture of the lamps it is alternatively possible to provide the amalgam-forming metal (such as indium) or an amalgam forming alloy (such as indium bismuth) separate from the mercury. Such a method has the advantage that the quantity of mercury can be dosed very accurately. In such a method use can be made of, for example, a metal capsule for the mercury as described in United Kingdom Pat. No. 1,475,458. In an embodiment of a lamp according to the invention, such a capsule also serves as the cover plate of the container after the mercury has been released into the discharge vessel by means of high-frequency heating during the manufacture of the lamp.

Figure 2:
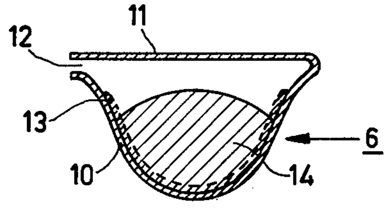
Figure 3:
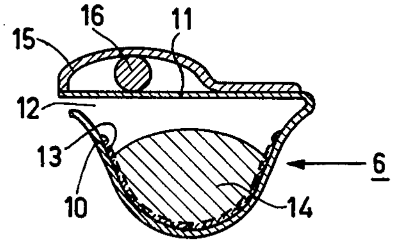
Figure 4:
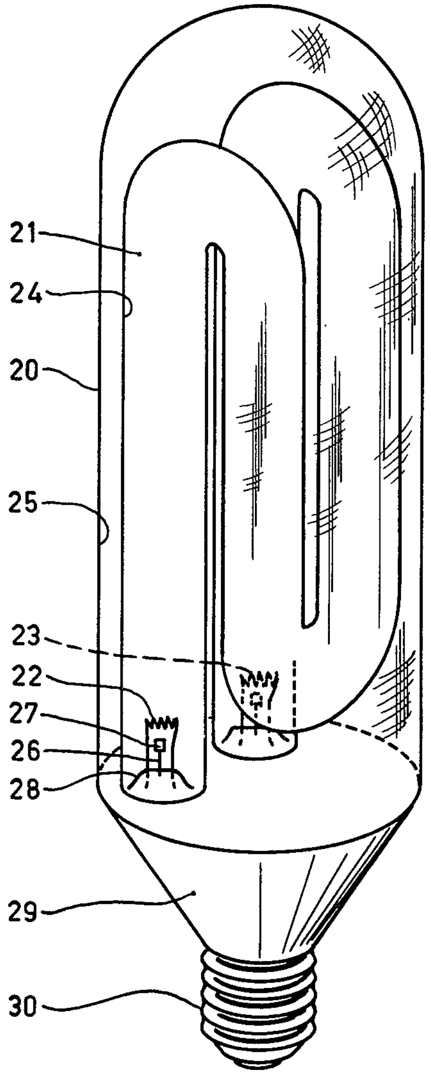

Embodiments of the invention will now be described with reference to the accompanying drawings, of which FIG. 1 shows diagrammatically an embodiment of a low-pressure mercury vapor discharge lamp according to the invention, FIG. 2 shows a cross-section of a container of a lamp according to the invention, FIG. 3 shows a cross-section of an alternative construction of a container of a lamp according to the invention, and FIG. 4 shows diagrammatically a compact low-pressure mercury vapor discharge lamp according to the invention having a folded discharge tube.

The lamp shown in FIG. 1 has a tubular glass discharge vessel 1 provided on the inside with a luminescent coating 2 consisting of manganese and/or antimony activated calcium halophosphate. Electrodes 3 and 4, respectively, are provided at the respective ends of the discharge vessel. An iron container 6 present on the foot 5 of the stem near the electrode 3 contains an amalgam-forming alloy consisting of indium and bismuth (see United Kingdom Pat. No. 1,503,636). The container is attached to the foot 5 by means of a suitable glue which is resistant to the action of the mercury discharge. An example of such a glue is "Autostic" (trade mark). As shown in FIG. 2, the container consists of a sheet iron plate formed to provide a receptacle 10 and a cover plate 11 arranged over the receptacle in such a manner that a slit 12, having a width of not more than 0.2 mm, for example approximately 0.1 mm, is formed between the cover plate and the receptacle rim. A thin (approximately 3 $\mu$m) nickel layer 13 is applied on the inner surface of the receptacle. An amalgam-forming alloy 14, for example of indium and bismuth as stated above, is secured to the inner wall by fusion thereto by means of the layer 13 in a reducing atmosphere at a temperature of 600° C. so that a very strong adhesion of the alloy to the wall of the receptacle is achieved. The inside surface of the cover plate 11 is processed by an oxidizing operation so that no amalgam adheres thereto. Consequently, the opening 12 will not be blocked by the amalgam 14 if the latter is displaced by a shock or vibration. A flat rectangular iron plate, approximately 0.2 mm thick, can be used as the starting material for the iron container. One half of the surface area of one side is oxidized and the other half is domed to provide a receptacle for the amalgam. Thereafter the inner surface of the wall of the recess is provided with a very thin (e.g. 3 $\mu$m) nickel layer and the amalgam is fused to the inner wall and the oxidized portion of the plate is then folded over the receptacle until the slit (12) is left.

In an alternative embodiment of the container, shown in FIG. 3, the cover plate consists of a metal capsule 15 which contains a small quantity of metallic mercury 16. After the lamp has been evacuated and the discharge vessel closed, the capsule 15 is heated by means of a high-frequency field so that it is opened (by bursting) and the mercury is released into the discharge vessel. The receptacle 10 contains an amalgam-forming metal alloy 14 consisting of indium and bismuth. During operation of the lamp a mercury amalgam is produced in the container which is in an open connection with the discharge vessel through the slit 12.

In a practical embodiment of a lamp as shown in FIG. 1 the tubular discharge vessel 1 was approximately 120 cm long and had a diamter of approximately 36 mm. The metal container (dimensions approximately 4.5×4.5×2 mm) contained 80 mg of an alloy of indium and bismuth. The quantity of mercury was 6 mg and the ratio in the amalgam in atoms of indium, bismuth and mercury was 45:49:6. When a power of 40 W was applied to the lamp, the luminous flux was approximately 3800 lm with a noble gas filling of argon-neon (75–25) (percent by weight) at a pressure of 331 pascal.

FIG. 4 shows an embodiment of a low-pressure mercury vapor discharge lamp according to the invention the discharge tube of which is folded so that a compact lamp is obtained which is suitable for use in luminaires for incandescent lamps for general lighting purposes. Such a lamp comprises a glass lamp envelope 20 wherein a discharge tube 21, folded three times, is present at whose respective ends the electrodes 22 and 23 are disposed.

The inside of wall 24 of the discharge tube is coated with a layer of luminescent material consisting of a mixture of two phosphors, namely green-luminescing terbium-activated cerium magnesium aluminate and red-luminescing trivalent europium-activated yttrium oxide. The inner surface 25 of the wall of the lamp envelope 20 is provided with a light dispersing layer of finely distributed titanium oxide. At a distance of between 10 and 20 mm, for example, from electrode 22 there is located at one end of a supporting wire 26 an iron container 27 having a slotted opening as shown in FIG. 2. The wire 26 is fused to a flat part (11) of the container. The other end of the supporting wire is electrically insulated from the supply wires of said electrode and is secured in the so-called foot 28. The lamp furthermore comprises a lamp base 29 which houses a glow discharge starter and an inductive stabilization ballast, so that the lamp can be fitted in an existing incandescent lamp luminaire by means of a suitable lamp cap 30. The overall length of the inner tube is approximately 44 cm. Its inside diameter is approximately 9 mm. With a power of 18 W applied to the lamp and the ballast together, an operating voltage of 105 V and a pressure of 400 pascal argon, the luminous flux of the lamp is approximately 900 lumen.

What is claimed is:

1. A low-pressure mercury vapor discharge lamp having a discharge vessel in which is located a container having an opening into the discharge vessel, the container containing a mercury amalgam for controlling the mercury vapor pressure in the discharge vessel, characterized in that the amalgam is secured to the inner surface of the wall of the container, said container comprising a sheet metal plate formed to provide a receptacle in which the amalgam is present and a cover plate which closes the receptacle except for a slit of not more than 0.2 mm wide between said cover plate and said receptacle.

2. A low-pressure mercury vapor discharge lamp having a discharge vessel in which is located a container having an opening into the discharge vessel, the container containing a mercury amalgam for controlling the mercury vapor pressure in the discharge vessel, characterized in that the amalgam is secured to the inner surface of the wall of the container, said container comprising a sheet metal plate formed to provide a receptacle in which the amalgam is present and a cover plate which closes the receptacle except for a slit of not more than 0.2 mm wide between said cover plate and said receptacle and the inner surface of the receptacle is provided with a nickel layer of approximately 3 micron thick and the inner surface of the cover plate is provided with an amalgam-repulsing layer.

3. A low-pressure mercury vapor discharge lamp as claimed in claim 2 characterized in that said lamp further includes first and second stems, each having a foot, first and second spaced electrodes respectively carried by said first and second stems, said container being disposed at a distance of 10 to 20 mm from said first electrode and said lamp further includes a supporting wire, said container being fastened to and carried by one end of said supporting wire, the other end of said supporting wire being secured in the foot of said first stem and is electrically insulated from electrode leads connected thereto.

4. A low-pressure mercury vapor discharge lamp as claimed in claim 1 characterized in that said lamp further includes first and second stems, each having a foot, first and second spaced electrodes respectively carried by said first and second stems, said container being disposed at a distance of 10 to 20 mm from said first electrode and said lamp further includes a supporting wire, said container being fastened to and carried by one end of said supporting wire, the other end of said supporting wire being secured in the foot of said first stem and is electrically insulated from electrode leads connected thereto.

5. A low-pressure mercury vapor discharge lamp as claimed in claim 3 characterized in that the cover plate forms a capsule for metallic mercury.

6. A low-pressure mercury vapor discharge lamp as claimed in claim 4 characterized in that the cover plate forms a capsule for metallic mercury.

* * * * *